(12) United States Patent
Qiao et al.

(10) Patent No.: US 8,941,899 B2
(45) Date of Patent: Jan. 27, 2015

(54) SIMULATED PAPER TEXTURE USING GLOSSMARK ON TEXTURE-LESS STOCK

(75) Inventors: Mu Qiao, Castro Valley, CA (US); Marc Rene, Rochester, NY (US); William A. Fuss, Rochester, NM (US); Shen-ge Wang, Fairport, NY (US); Paul Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 1000 days.

(21) Appl. No.: 13/031,646

(22) Filed: Feb. 22, 2011

(65) Prior Publication Data
US 2012/0212753 A1    Aug. 23, 2012

(51) Int. Cl.
*G03F 3/08* (2006.01)
*G03G 15/01* (2006.01)
*B44C 1/18* (2006.01)
*G06T 11/00* (2006.01)

(52) U.S. Cl.
CPC .............. *G03G 15/0115* (2013.01); *B44C 1/18* (2013.01); *G06T 11/001* (2013.01); *G03G 2215/00805* (2013.01)
USPC ........................................ 358/518; 345/604

(58) Field of Classification Search
USPC ................................. 358/501–598
See application file for complete search history.

(56) References Cited

U.S. PATENT DOCUMENTS

| | | |
|---|---|---|
| 4,210,346 A | 7/1980 | Mowry, Jr. et al. |
| 5,695,220 A | 12/1997 | Phillips |
| 5,734,752 A | 3/1998 | Knox |
| 6,108,512 A | 8/2000 | Hanna |
| 7,092,128 B2 | 8/2006 | Wang et al. |
| 7,126,721 B2 | 10/2006 | Wang |
| 7,148,999 B2 | 12/2006 | Xu et al. |
| 7,180,635 B2 | 2/2007 | Wang et al. |
| 7,193,751 B2 | 3/2007 | Wang et al. |
| 7,295,341 B2 | 11/2007 | Nagarajan et al. |
| 7,301,675 B2 | 11/2007 | Wang et al. |
| 7,304,770 B2 | 12/2007 | Wang et al. |
| 7,324,241 B2 | 1/2008 | Eschbach et al. |
| 7,352,493 B2 | 4/2008 | Liu et al. |
| 7,382,495 B2 | 6/2008 | Liu et al. |
| 7,391,537 B2 | 6/2008 | Eschbach et al. |
| 7,589,865 B2 | 9/2009 | Eschbach et al. |
| 7,656,556 B2 | 2/2010 | Wang |
| 7,813,006 B2 | 10/2010 | Liu et al. |
| 2005/0213120 A1* | 9/2005 | Ohkawa et al. ............... 358/1.9 |
| 2007/0177759 A1 | 8/2007 | Eschbach et al. |
| 2007/0262579 A1 | 11/2007 | Bala et al. |

(Continued)

OTHER PUBLICATIONS

U.S. Appl. No. 12/968,843, filed Dec. 15, 2010 titled "System to Enable Development of Clear Toner Forms", by David C. Robinson et al.

(Continued)

*Primary Examiner* — Benny Q Tieu
*Assistant Examiner* — Michael Y Tzeng
(74) *Attorney, Agent, or Firm* — Fay Sharpe LLP

(57) ABSTRACT

A method for simulating a textured appearance on a uniform substrate includes using variable halftone dot orientations. A texture description is provided for generating electronic data representing a three-dimensional texture. Texture regions of the texture description are identified using pixel cells in the electronic data. Halftone dot orientations are assigned for each pixel cell based on a value of the pixel cell. The halftone dot orientation represents a recessed or a raised surface portion.

16 Claims, 8 Drawing Sheets

(56) References Cited

U.S. PATENT DOCUMENTS

| | | |
|---|---|---|
| 2007/0264476 A1 | 11/2007 | Bala et al. |
| 2008/0192297 A1 | 8/2008 | Wang et al. |
| 2009/0059304 A1* | 3/2009 | Manfredi et al. ............ 358/3.06 |
| 2009/0251748 A1* | 10/2009 | Luttmer ........................ 358/518 |
| 2010/0128321 A1 | 5/2010 | Wang |

OTHER PUBLICATIONS

U.S. Appl. No. 12/913,226, filed Oct. 27, 2010, titled "Simulated Paper Texture Using Clear Toner on Uniform Substrate", by Mu Qiau et al.

* cited by examiner

SIMULATED PAPER TEXTURE USING GLOSSMARK ON TEXTURE-LESS STOCK

BACKGROUND

The present disclosure is directed toward providing a perceived texture appearance on a uniform substrate. More particularly, variable halftone dot orientations are assigned to pixel cells, wherein each orientation corresponds to a raised or recessed texture portion.

A textured substrate is a print media having a noticeable third dimension resulting from raised pattern portions. Textured substrate is used to provide an attractive appearance in products such as business cards, greeting cards, scrapbook pages, wallpaper, wrapping paper, and other paper and fabric-based merchandise. The techniques and materials used to produce the textured patterns may add significantly to the production costs. For example, a ruche pattern is achieved by bunching the material up in a linear pattern. In another example, a two-sided textured substrate is achieved by laminating together two cardstocks. Patterns tend to be applied to thicker substrates so that the material does not tear during the manipulation process.

In addition to higher consumer costs, a further disadvantage associated with textured substrate may be less sharp results during electronic printing. Traditional printing techniques, utilizing a press, provide clear text results on textured substrate because an inked surface of the press contacts the textured print media. However, ink or toner materials used for electronic, laser, digital, and xerographic printing techniques are lightly applied to the substrate. The toner or ink tends to not reach recessed portions of the substrate surface. The text printed on rough textured patterns can be illegible.

Consumer image forming devices situated in homes and offices generally print using electronic methods, and thus consumers are limited to purchasing non-textured stock. There is also a need to reduce costs of manufacturing textured substrates in commercial environments by expanding the characteristic types of substrates that may be utilized.

There is hence a need for a textured appearance produced on inexpensive substrates. There is also a need for a less expensive alternative to textured substrates that may be produced in a consumer environment. The present disclosure provides a method for applying a textured appearance to texture-less substrate using glossmarks.

INCORPORATION BY REFERENCE

This application is related to co-pending, commonly assigned U.S. patent application Ser. No. 12/913,226, filed Oct. 27, 2010, entitled "SIMULATED PAPER TEXTURE USING CLEAR TONER ON UNIFORM SUBSTRATE", and naming Mu Qiao, et al. as inventors, and is incorporated herein by this reference in its entirety.

Cross reference is also made to U.S. Pub. No. 2010/0128321, published on May 27, 2010, entitled METHODS AND SYSTEMS TO EMBED GLOSSMARK DIGITAL WATERMARKS INTO CONTINUOUE-TONE IMAGES, by Shen-Ge Wang, et al., the disclosure of which is incorporated by reference herein in its entirety.

BRIEF DESCRIPTION

In a first exemplary embodiment of the disclosure, a method provides for simulating texture on a uniform substrate. A texture description may be provided for generating electronic data representing a three-dimensional texture. A print instruction for the texture description may be concatenated with a print instruction for a primary image. The concatenated instructions form a print job. A perceived texture image may be produced on a generally uniform substrate by rendering toner at variable halftone dot orientations.

In another exemplary embodiment, texture regions of the texture description may be identified using pixel cells in the electronic data. At least two halftone dot orientations may be assigned to the pixel cells for representing the texture regions.

In yet another exemplary embodiment, a system is provided for formulating an output having a simulated texture. A textured image source is adapted to provide an original texture description. A processor is adapted to identify texture regions of the original texture description using pixel values. The processor is further adapted to determine a variable halftone dot orientation for assigning to each pixel cell based on the pixel values. An image forming apparatus is adapted to render a perceived texture on a substrate surface by applying a pigmented toner layer to the surface at the variable halftone dot orientations.

DETAILED DESCRIPTION

Figure 1:
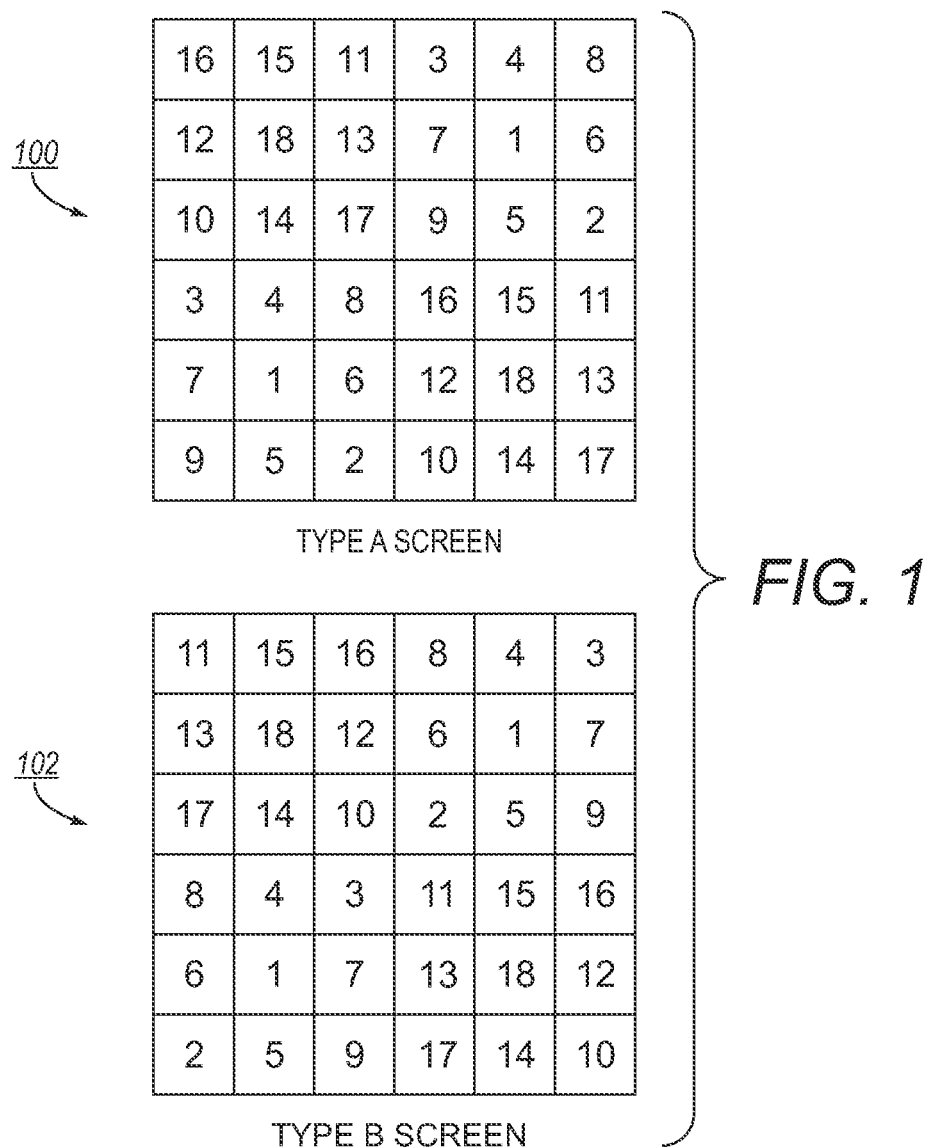
FIG. 1 illustrates two 6×6 halftone screens suitable in anisotropic structure to produce discernable gloss differentials for practicing the exemplary method.

The present application is directed toward a generation of perceived texture using Glossmark™ technology, which is based on a differential gloss characteristic. A technique disclosed herein creates a textured appearance using differential gloss characteristics of multiple segments of an image. The differential gloss segments may be discerned as raised and recessed texture portions when a viewer holds a substrate at an angle. The differential gloss texture may be generated by alternating between at least two different halftone screens. The halftone screens produce different gloss characteristic in halftone outputs.

The present disclosure is directed toward using the differential gloss to form a perceived textured substrate, which can be a uniform, substantially texture-less substrate having a textured appearance provided by printing. The disclosure is further directed toward a method for forming the perceived textured substrate and an apparatus adapted to produce the substrate. The substrate may be any two-dimensional material adapted to carry toner and/or liquid ink (hereinafter collectively referred to as "toner") applied using electronic, digital, xerographic, or laser printing methods. The substrate may include, for example, cardstock, papers, and fabrics.

Texture, as it is described herein, refers to a third dimension. The perceived textured substrate of the present application is substantially a two-dimensional material given a perceived third-dimensional appearance. In some embodiments, however, the material may be given an actual third dimension based on certain later discussed select pile heights. More specifically, the textured substrate includes a variable (or non-uniform) surface portion. A uniform surface, as described herein, includes a generally smooth substrate surface area. A textured surface alternately includes variable heights and/or impressions formed across the surface area. Variable patterns are formed by first portions that are generally raised relative to second ("recess") portions. A perceived textured substrate may include a slight non-uniform surface to the touch based on an amount of toner being applied at variable pile heights. The pile heights build raised toner portions relative to the substrate surface. However, the perceived textured substrate of the exemplary embodiment may include a generally uniform surface having an appearance of raised and recess portions. This non-uniform appearance may be rendered using a halftone technique that is disclosed herein.

In halftone printing, a contone image (an image in which gray levels are substantially continuously variable) is converted to a binary image before printing. At a specified location, or pixel, a spot is either printed or not printed, which is controlled by halftone techniques. The most common halftoning method is screening, in which a halftone screen determines how a cluster of pixels grows with increasing gray level. Here, gray level refers to increasing intensity for any channel, irrespective of whether it is a monochrome or a color channel. The halftone screen compares the required continuous tone levels with predetermined threshold levels typically defined for a rectangular cell that is tiled to fill the image plane. The output of the screening process is a binary pattern of multiple small "dots," which are regularly spaced in a grid as is determined by the size, shape, and tiling of the halftone screen. In a conventional screening process, the dots grow generally radially outward as gray level increases to form circular-shaped clusters. In current Glossmark™ technology, two halftone screens having different anisotropic structure orientations are used. The anisotropic structure may be provided by the growth pattern and/or orientation of the screen. By toggling between the two halftone screens in generating the halftone image, differences in gloss are apparent when the rendered image is viewed at an angle.

Techniques for generating differential gloss patterns in printed images are described, for example, in above-mentioned U.S. Pub. No. 2010/0128321, incorporated herein by reference. A digital image which has been pre-halftoned includes binary image data, for one or more color channels. In the case of a monochrome image, the image data may be for a single color channel, such as a black channel. In the case of a color image, image data for up to four (or more) color channels, such as cyan, magenta, yellow and optionally black channels may be provided.

In a differential gloss image, as used herein, a plurality of different halftone screens may be used in forming a halftoned binary image. The screens may generate halftone structures with similar sizes and shapes but different polarization directions. By toggling between the halftone screens in generating the halftone image, regions of the printed image have different gloss characteristics. These differences are apparent as differences in gloss when the rendered image is viewed at an angle. The embedded gloss pattern created by this process may be, for example, a text, logo, or binary image. In the case of a color image, the same pattern may be embedded into each of the color channels (CMYK), such that when rendered, the differential gloss patterns are substantially in superimposition one on top of the other in the printed image.

The halftone screens used in generating the differential gloss patterns have different anisotropic structure orientations provided by differences in dot growth patterns. Typically, the halftone structures (clusters) generated by the screens have similar sizes and shapes (for a given gray level) but different polarization directions.

If the incident light is from directly above the paper, the diffused light and the reflected light at orthogonal angles to the paper for the two halftone structures are typically equal. In this way, the light which is available to a scanner or to the human eye from directly above is the same. However, the specular reflected light is considerably greater for one of the anisotropic orientations at a given off-normal angle. If as printed, a mass of the first orientation halftones are butted directly adjacent to a mass of the second orientation halftones, there will be a difference in reflected light between them, which will be perceived as gloss differential, or a differential gloss (Glossmark™) image, when viewed from an angle. The perceptibility of this gloss differential is generally maximized when the halftone anisotropic orientations are 90-degrees apart. In practice, this is typically provided by screens at +45° and −45° from the printing (process) direction. For each dot location, the screen may comprise a grid of cells (pixels), each of which may be on or off. The dot may grow, with increasing gray level, from a single pixel or from multiple pixels. It will be appreciated that the anisotropy is most apparent at intermediate gray levels where at least some but not all the pixels are turned on. At high or low gray levels, where substantially all or none of the pixels are turned on, the anisotropy is diminished or absent.

In one embodiment, the halftone dot growth may be as illustrated in FIG. 1, which shows the orders in which pixels are switched on for two exemplary 6×6 halftone screens. The type-A screen 100 and type-B screen 102 both have a 45-degree orientation, one to the right and the other to the left. The orientation can be easily seen in the case when only pixels with rank orders equal to or less than about 3 are switched on. To maximize the perceptibility of the gloss differential, the orientations of screens type-A and type-B are arranged at 90 degrees one from the other. However, the exemplary method is not limited to the halftone screens shown and is capable of detecting differential gloss images where the halftone structures of at least one of the color channels in an image exhibit at least some degree of anisotropy.

As will be understood by those skilled in the art, the intended differential gloss image data may be flattened into simple zero and one pixel data representations. This pattern of zero and ones is then used to toggle a multiplexer to one halftone anisotropic structure orientation type or the other. A multiplexer therefore toggles between a type-A screen and a type-B screen, as dictated by the desired Glossmark™ data, to produce the composite result of raster input processed (RIP) image data as passed to a marking engine. In this way, a superimposition of a Glossmark™ texture pattern may be embedded into the primary image which can only be perceived as a gloss differential image.

Figure 2:
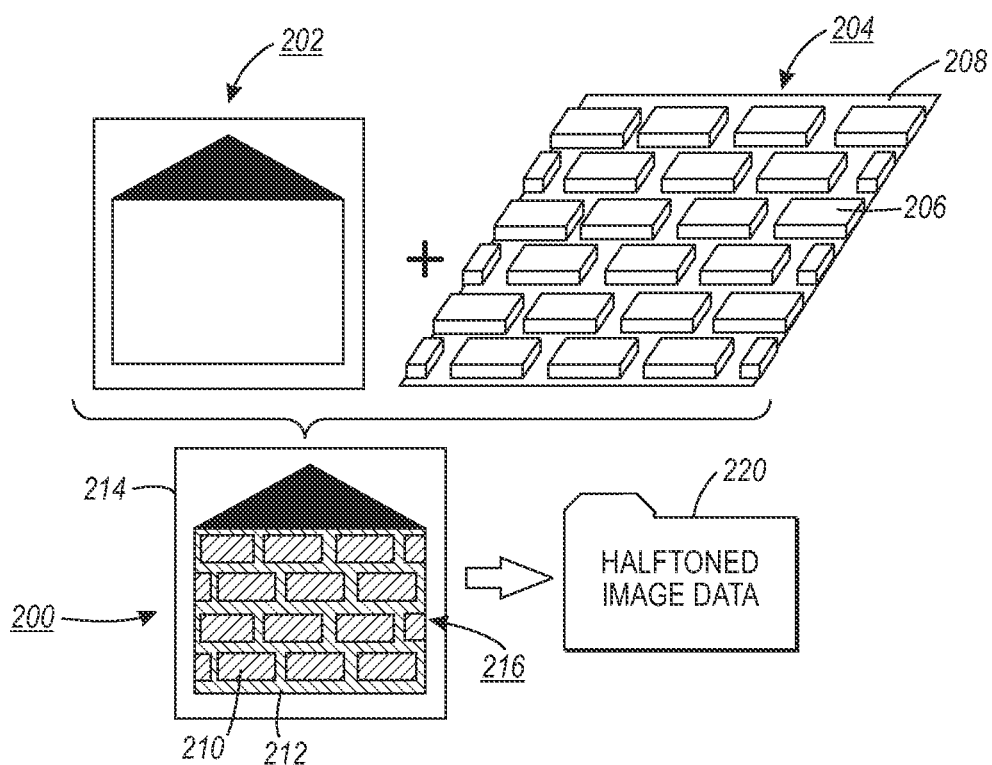
FIG. 2 depicts a formation of a perceived texture image generated with screens similar to FIG. 1.
Figure 3:
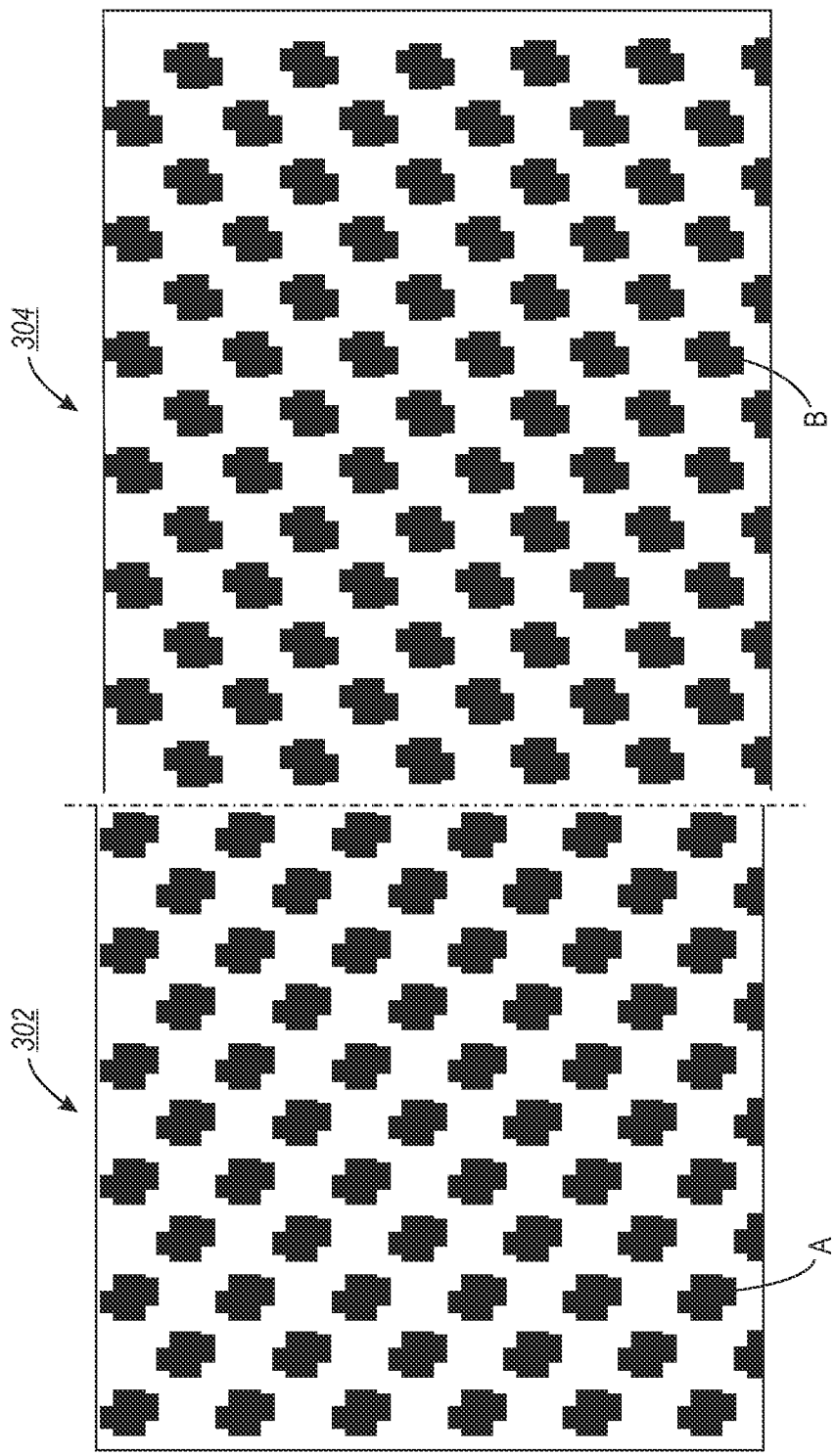
FIG. 3 illustrates regions of halftone structures generated with the screens of FIG. 1.

FIG. 2 depicts the creation of a Glossmark™ textured image 200 of the present disclosure, which may be achievable using halftone screens as described above. A primary image 202 (shown as a house) and a textured pattern 204 (shown as a three-dimensional brick 206 design on an original substrate 208) are combined by screening (one-dimensional) bricks 210 within a house image 216 with a first screen and screening mortar regions 212 within the house image with a differential gloss pattern, which is screened with a second halftone screen. The resulting textured image 200 is a patchwork of the halftones created by the two screens rendered on a uniform substrate 214. While the exemplary embodiment is described in terms of two halftone structures, it will be appreciated that more than two halftone structures may be employed in creation of the image. FIG. 3 illustrates a portion of an exemplary image, when printed, in which halftone structures of types A and B are shown magnified within first and second regions 302 and the remainder of 304.

The halftoned image data thus formed may be stored as a digital image data file 220 (FIG. 2) to be rendered by the same or a different image forming apparatus or device from that device used for creating the digital image file. For example, the image data file may be stored for later rendering on an image forming apparatus that does not have software for creation of differential gloss images.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

Figure 5:
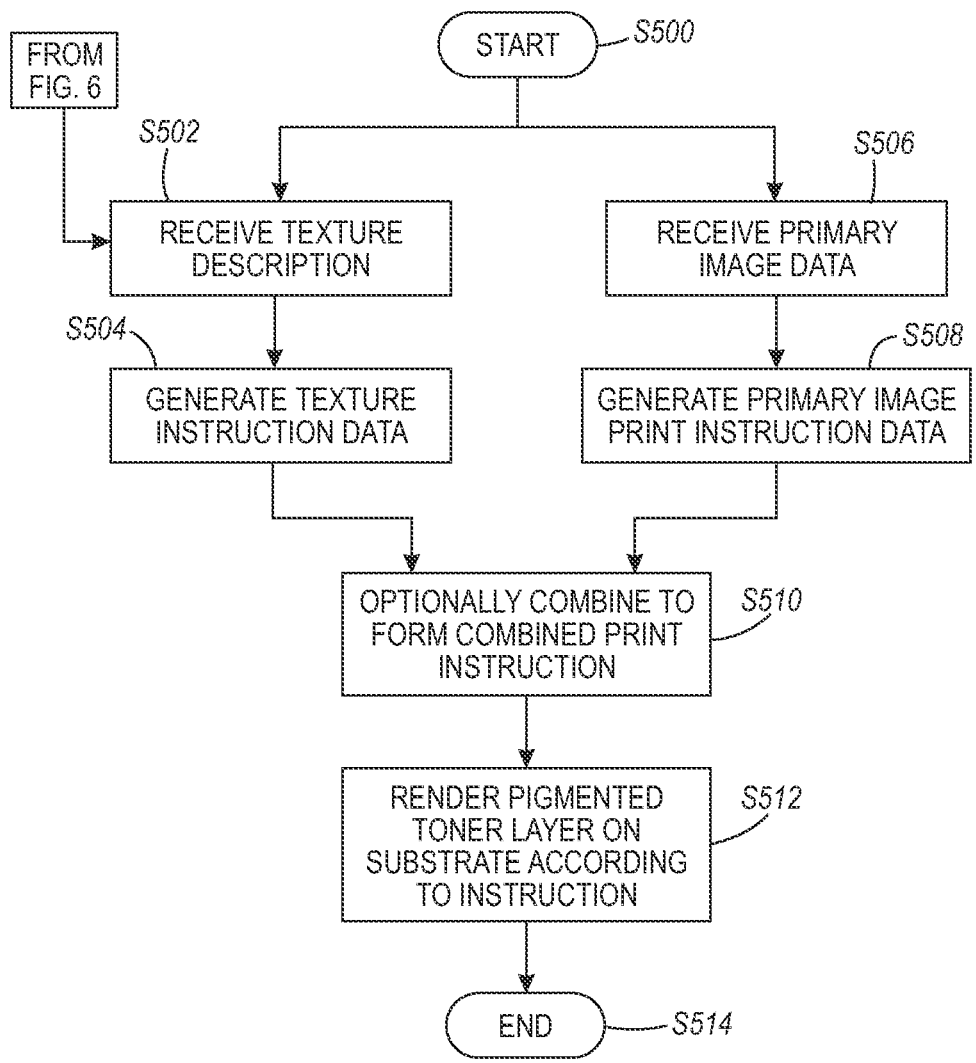
FIG. 5 is a flowchart depicting an overview of the method embodiments according to the disclosure.
Figure 6:
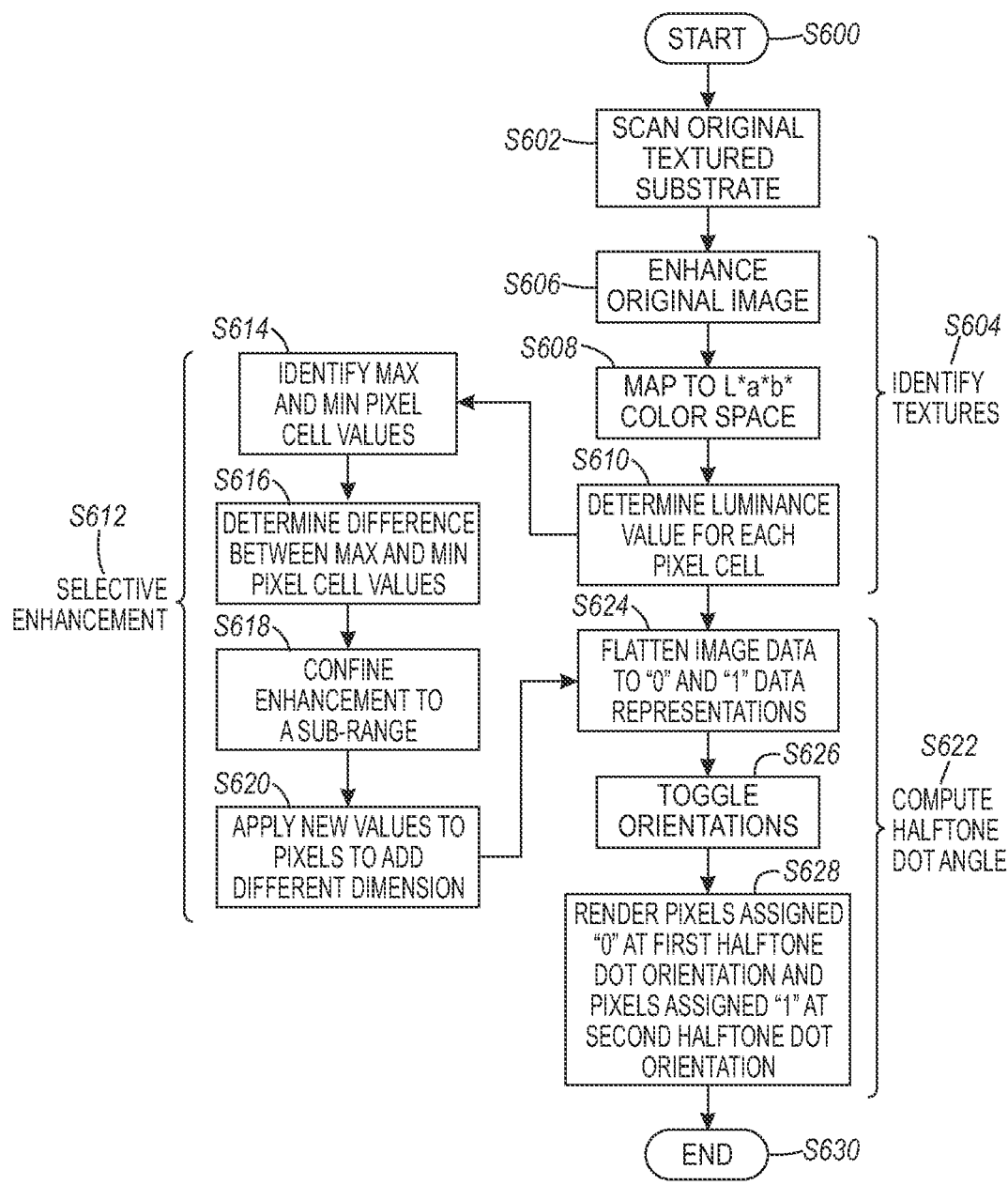
FIG. 6 is a flow chart depicting a method for generating a perceived textured image according to an embodiment of the disclosure.
Figure 7:
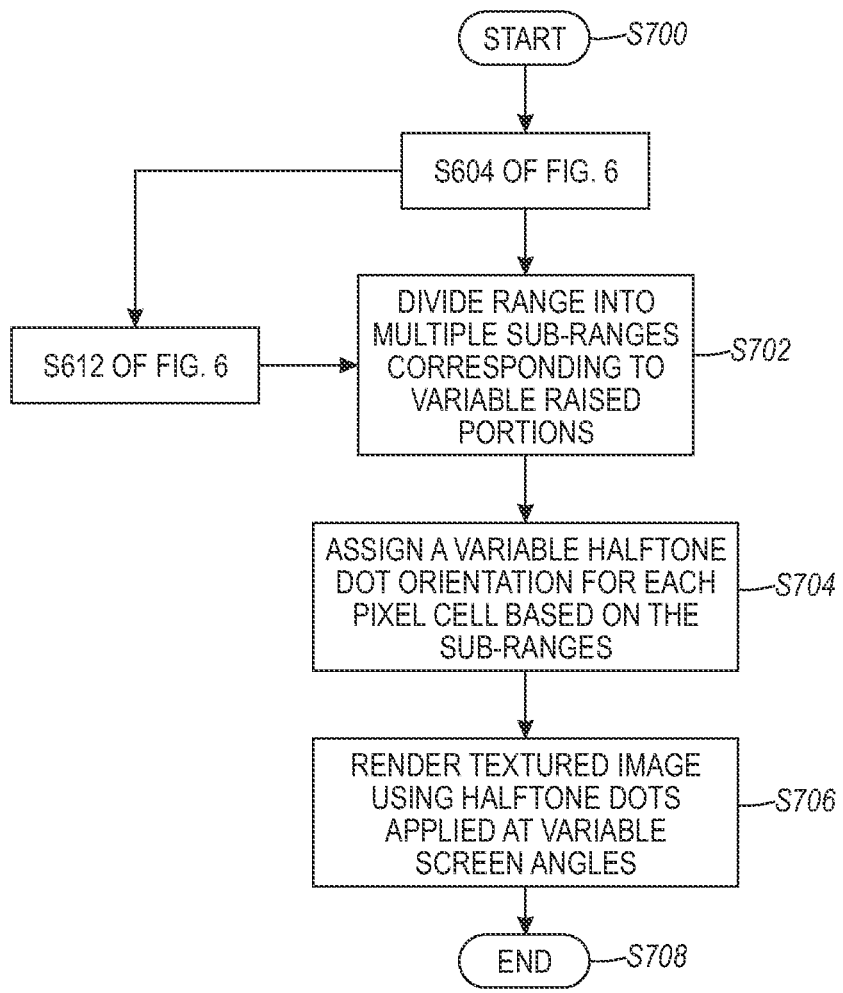
FIG. 7 is a flowchart depicting a method for generating the perceived textured image according to another embodiment of the disclosure.

The method illustrated in FIGS. 5-7 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Figure 4:
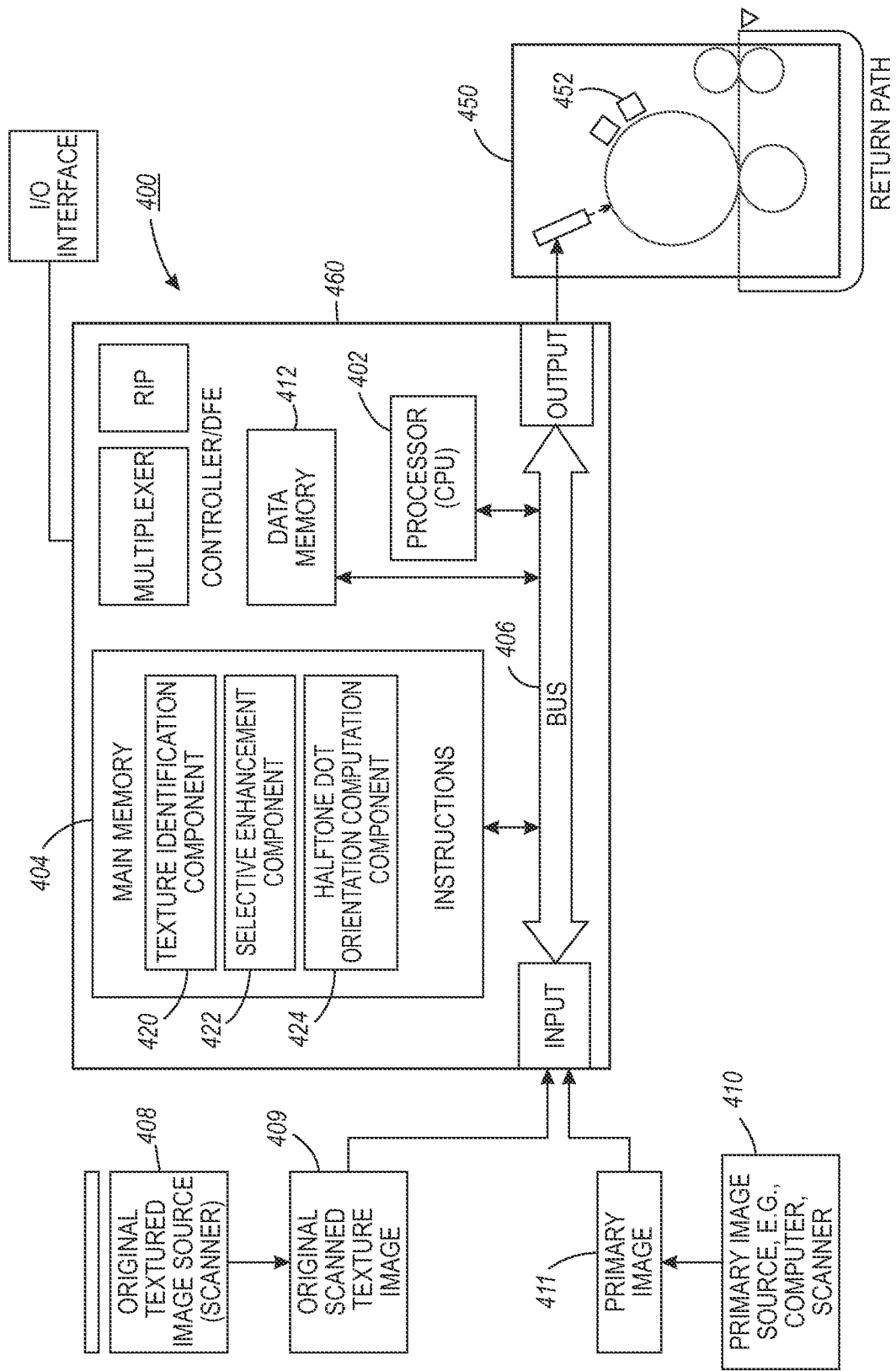
FIG. 4 is a functional block diagram of a system for generating a perceived texture appearance on a uniform substrate.

With reference to FIG. 4, a functional block diagram of a computer system 400 is shown. The computer system 400 may be a PC, such as a desktop, a laptop, palmtop computer, portable digital assistant (FDA), server computer, cellular telephone, pager, or other computing device capable of executing instructions for performing the exemplary method. The computer system 400 may be further embodied in a networked image forming apparatus, although it is also contemplated that the system may be located elsewhere on a network to which the image forming apparatus is connected, such as on a server, networked computer, or the like, or distributed throughout the network or otherwise accessible thereto. The network interface allows the computer to communicate with other devices via a computer network, such as a local area network (LAN), a wide area network (WAN), or the internet, and may comprise a modulator/demodulator (MODEM).

The illustrated computer system 400 includes a controller 460 formed as part of at least one image forming apparatus for controlling an operation of at least one marking (or print) engine for forming the perceived texture on print substrates. Alternatively, the controller 460 may be contained in a separate, remote device that is connected with the image forming apparatus. The instruction data may be output from the controller 34 for further print processing at the print engines. The controller 460 contains a processor 402, which controls the overall operation of the computer system 400 by execution of processing instructions which are stored in memory 404 connected to the processor 402. Computer system 400 also includes a network interface and a user input output interface. The I/O interface may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor. The various components of the computer 400 may be all connected by a bus 406. The processor 402 executes instructions for performing the method outlined in FIGS. 5-7.

The electronic textured and original image data is processed by the processor 402 according to the instructions contained in the memory 404. The memory 404 stores a texture identification component 420, which identifies pixel cells representing textured regions from an original three-dimensional texture description, a selective enhancement component 422, which enables a confinement of values corresponding to the pixel cells to be within a selected range, and a halftone dot orientation computation component 424, which assigns a halftone dot orientation to each of the pixel cells. These components 420-424 will be later described with reference to the method. The data undergoes processing according to the various components for generating a print instruction, which is stored in the data memory 412.

The memory 404 stores instructions for performing the exemplary method as well as the processed data. The memory 404 may represent any type of tangible computer readable medium such as random access memory (RAM), read only memory (ROM), magnetic disk or tape, optical disk, flash memory, or holographic memory. In one embodiment, the memory 404 comprises a combination of random access memory and read only memory. In some embodiments, the processor 402 and memory 404 may be combined in a single chip.

FIG. 4 further illustrates the computer system 400 connected to an original textured image source 408 for inputting a texture description into the computer system 400. This textured image source 408 may include an image capture device, such as a scanner, a camera, or a profilometer, for converting an original three-dimensional image 409 into a two-dimensional electronic format. A primary image source 410 is also connected to the computer for inputting a primary image 411 into electronic format. This original image source may include the same or a separate image capture device, such as a scanner, a computer, or the like. The original texture and primary image sources 408, 410 are in communication with the controller 460 containing the processor 402 and memories 404, 412.

In another embodiment, the textured and primary image data 409, 411 may be input from any suitable image source 408, 410 such as a workstation, a database, a memory storage device, such as a disk, or the like. Typically, each input digital image includes image data for an array of pixels forming the image. The image data may include colorant values, such as grayscale values, for each set of color separations, such as L*a*b or RGB, or be expressed in another color space in which different colors can be represented. In general, "grayscale" refers to the optical density value of any single image data channel, however expressed (e.g., L*a*b, RGB, YCbCr, etc.). The images may be photographs, video images, combined images which include photographs along with text, and/or graphics, or the like. The images may be received in JPEG, GIF, JBIG, BMP, TIFF or other common file format used for images and which may be converted to another format such as CMYK colorant values prior to processing. Input textured and original images may be stored in the data memory during processing.

An image forming apparatus, as used herein can include any device for rendering an image on print media, such as a laser printer, bookmaking machine, or a multifunction machine having copying and/or faxing as well as printing capability. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming apparatus and may include text, graphics, pictures, and the like. The operation of applying images to print media, for example, graphics, text, photographs, etc., is generally referred to herein as printing or marking. While in the exemplary embodiment, the image forming apparatus is described in terms of a xerographic printer, it is also contemplated that the image forming apparatus may incorporate inkjet or other marking technology.

The image forming apparatus includes a marking engine 450. A pigmented toner applying component 452, such as a cartridge, supplies colored toner for applying to a substrate passing through the marking engine 450. In an exemplary embodiment, four CMYK colorant toners are used. The marking engine 450 includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied (four in the case of a CMYK printer), such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser, which fuses the image to the substrate. The fuser generally applies at least one of heat and pressure to the sheet to physically attach the toner.

FIG. 5 illustrates an overview of the method embodiments according to the disclosure. The method starts at S500. The controller receives a texture description at S502, which may be provided using the method described later with reference to FIG. 6. The data corresponding to the texture description undergoes a set of instructions and/or computations to generate texture instruction data at S504. This instruction data is stored in data memory 412 of FIG. 4. The controller further receives primary image data at S506. The data corresponding to the primary image data is also used to generate primary image print instruction data at S508. This data is also stored in the data memory. The texture instruction data of S404 and the primary image print instruction data of S508 may be combined at S510 to form a selected print instruction used to print a perceived textured image as a single print job.

An instruction for the perceived texture description is combined with an instruction for the graphical or pictorial (or text) image (hereinafter collectively referred to as the "primary image") to generate the print job at S510. More specifically, the perceived texture instruction is created with the primary image instruction so that the set of instructions may be sent to the marking engines together as one print job. The combining action and/or merging action for concatenating the perceived texture and image instructions may be entered using a print driver. The options may be accessed, for example, via an application for print previewing, print options, or a print command. For example, the print driver may include options for concatenating the instructions. It is contemplated in other embodiments, however, that an image instruction may not be concatenated with the texture instruction. Rather, the perceived texture may be printed on a surface portion of the substrate using an image forming apparatus while not printing the texture as part of an image.

In one embodiment, the texture description may be merged with at least a second texture description to generate a combined texture description. The processor (see 402 of FIG. 4) may combine multiple texture descriptions. As an example for illustrative purposes, a first texture description may be generated to provide a first textured pattern that may cover a first portion of at least one surface of a substrate. A second textured pattern may be provided by a second texture description for covering at least a second portion of the substrate surface. The first and second portions may overlap one another, be situated adjacent to one another, or be situated on opposite surfaces.

In an alternate embodiment, at least a generated first texture description may be created with the primary image instruction to produce the print job before a second texture description is generated. In this embodiment, the print job may be combined with a generated second texture description to produce a modified, second print job. For illustration purposes, a first texture description may be formed to include a pattern for covering an entire surface area portion of the substrate. This first texture description instruction may be created with the primary image instruction to form the first print job. A second texture description may be combined with the print job to form a modified print job. This second image may include, for example, a second textured border that is arranged to surround or partially frame the first textured image. There is however no limitation made to a sequence of actions performed during the creation stage.

After the (first or modified) print job is generated, a print command may be issued. The print command sends the print job to an image forming apparatus, which sends the instructions to a marking engine. The image forming apparatus (e.g., engine 450 of FIG. 1) renders perceived texture on a substrate at S512 using a pigmented toner applying component. When the texture description is concatenated with the primary image print instruction data, a textured image description is formed. In one embodiment, the textured image description results in the primary image including texture. Accordingly, the combined print instruction may assign pixels inside the edges of the primary image with a variable halftone dot orientation. In another embodiment, the background may include a perceived texture while a foreground image includes the primary image. In this embodiment, pixels situated beyond the edges of the primary image may be assigned variable halftone dot angles. In alternate embodiments, the entire substrate surface may be assigned a variable halftone dot orientation such that the foreground and the background images both include a perceived textured appearance. The texture description may include variable halftone angles programmed for rendering halftone dots to a portion of at least one surface region of a substrate. There is no limitation made herein to a programmed region(s) selected for the perceived texture description. The method ends at S514.

The pigmented toner imitates an appearance of texture, such as in textured substrates that are grooved or otherwise given a third-dimension. The pigmented toner may be applied to the substrate at different halftone dot orientations or screens to achieve a select differential of glossiness between perceived raised and recess portions of a texture. The angle or orientation of a pixel cell corresponds to a degree of shadow and/or shading created by variable heights of raised portions in relation to recessed portions in a three-dimensional textured substrate. In other embodiments, the substrate may be selectively further subjected to multiple passes in the image forming apparatus to achieve a select pile height. The pile height may be achieved by laying a 100% halftone value per pass. The number N of passes through the apparatus results in a 100N % pile height. Variable pile heights may be utilized for different surface portions of the substrate so that a dimension may be slightly detected by touch. The pile heights may be determined by default, by computations, by a look-up table (LUT), or based on user-selections made using options presented by a print driver during a creation stage. The pile heights may alternatively be based on programmed texture patterns stored in the memory. The number of layers of pigmented toner rendered onto the substrate builds variable height at select regions while creating recesses at the original uniform substrate surface. Accordingly, an actual, rather than a perceived, texture may be obtained.

In one embodiment, duplex printing may be utilized to print a textured image and/or surface on both sides of the substrate. The perceived texture or textured image may be printed on a second, opposite surface of the substrate along with the first surface. In one embodiment, the same texture description may be used to print a first perceived texture on both the first and second surfaces of the substrate. In another embodiment, a different texture description may be used to render a second perceived texture on the opposite surface.

Now referring to FIG. 6 a method is shown for generating a textured image according to an embodiment of the disclosure. The original textured image data may be applied to texture identification component (see 420 of FIG. 1) at the image forming apparatus or at a remote computer. The process starts at S600. A texture description may be input into the system using the image source 408 of FIG. 4. In one embodiment, original texture data may be input into the system via an image capture device. For example, an original textured substrate may be scanned at S602 to convert a three-dimensional pattern to (two-dimensional) electronic information. In one embodiment, a high resolution scanner may be used. The textured substrate is preferably a plain (or white) substrate having no pigmented toners previously applied to it. The scanned original image may be mostly white with a low dynamic range.

Alternative methods to scanning an original substrate may be used for providing data in electronic format. In one embodiment, a profilometer may be used to measure a profile of a surface portion of the original textured substrate. The measurement(s) may be used to generate a quantified variable, such as roughness. Another alternate method to scanning the three-dimensional pattern may include, for example, mathematically creating a texture using existing techniques in computer graphics. The texture may be viewed on a monitor and leveraged for texting and/or shading and other visual effects on the substrate. Graphics libraries may be incorporated into and/or used by a plug-in. For example, OpenGL or DirectX built-in to a particular operating system such as Widows, Mac, or Linux may be used to access online libraries. Computer graphics algorithms may be applied to synthesized textures to provide additional realism or other visual effects. It is contemplated that textures may be procured (without cost or for a fee) from online libraries that contain a variety of hopsack, ruche, linen-embossed, hammered, burlap, floral, vector, cork, denim, and brick patterns, etc. The aforementioned list is not meant to be limiting; rather, it includes examples only. Accordingly, an image processing algorithm may be applied to the provided image to digitally control the amount of perceived texture subsequently printed on a uniform print media.

Figure 9:
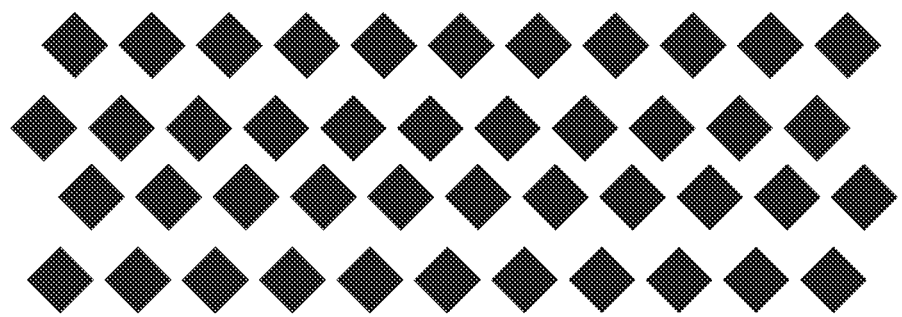

In yet another embodiment, a texture description may be generated by user-design. FIG. 9 illustrates, for example, an evenly spaced diamond pattern that may be created by a user. This spaced apart shape texture (or a similar user-created texture) may be created using known applications. The user may input different degrees of shading to describe the aimed level of dimension. It is further contemplated in other embodiments that the system may automatically determine the texture description based on a type of substrate loaded into the apparatus.

Furthermore, the electronic data may be provided to the system. For example, the (previously generated) electronic data may be carried on a media disc, flash drive, zip drive, and the like, and transferred to the system. The electronic data may be communicated to and/or uploaded to the controller for processing in a conventional manner.

The scanned or alternatively produced original image data may be contained in the memory until it selectively undergoes processing to identify the various textures (and/or textured regions) at S604. In one embodiment, the processing of the texture identification component (or any later discussed component) may be instituted by means of a user selection or instruction for creating a perceived textured description. This instruction may be instituted, for example, by selection of an application for print preview or a print command option. In another embodiment, the texture generation actions may be instituted by a user selecting a "texture generation" application available with the platform used to modify the textured image description in a respective program.

Figure 8:
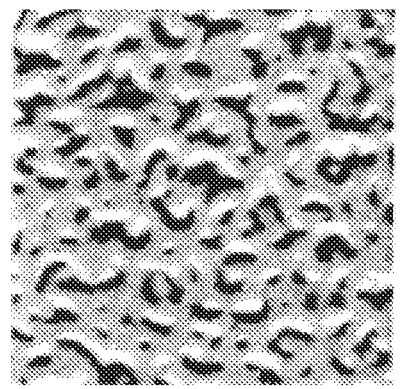
FIG. 8 illustrates an enhanced texture of an original three-dimensional textured substrate converted to electronic format; and, FIG. 9 illustrates an example pattern that may be provided as an original texture image.

There are certain original textured substrates that include non-uniform regions that are microscopic, i.e., the relative raised and recess portions cannot be seen by a naked eye. To simulate the respective texture using a pigmented toner(s), these portions are identified so that variable toner halftone dot orientations may be assigned to pixels corresponding to them. The (scanned or displayed) original image may be enhanced and/or enlarged at S606 to make the recesses and/or raised portions viewable to the naked eye. FIG. 8 illustrates an enhanced texture of a three-dimensional textured substrate converted to electronic format.

The processor next extracts different (brightness) values for distinguishing between the raised and recess regions of the original three-dimensional textured substrate. More specifically, the regions are identified by mapping image pixel values to a suitable color space at S608, such as an L*a*b color space. Accordingly, each pixel of the enhanced image may be described as a single number (at S610) representing a luminance L of the pixel between 0 and 255 on an 8-bit scale. A look-up table, a computation, or any known method may be used to map the color channels into the L*a*b color space. The value zero (0) is assigned to black pixels and the value 255 is assigned to white pixels, wherein any value in between the 0 and 255 range describes a different shade of gray. As mentioned, the shades of gray correspond to variable heights of raised portions in the original textured substrate.

In a further stage of the process, operations may be performed to the selectively control a degree of the enhancement at S612 so that the original texture description is not over- or under-enhanced when it is converted to electronic format. A luminance range may be controlled using the selective enhancement component (see 422 of FIG. 1) to enhance the perceived texture applied to the substrate. To control the enhancement, maximum and minimum values may be identified S614 after the luminance values are extracted at S610. A difference between the maximum and minimum values may be computed at S616 to extract a partial dynamic range. The partial dynamic range may then be enhanced to a full dynamic range. The enhancement may then be confined to a selected sub-range S618 that is not as strong as the full dynamic range. A modified luminance value within the sub-range is assigned to each pixel cell at S620. In one embodiment, for example, the pixel values may be confined to a sub-range that is approximately one-half the full range. For example, the pixel values may be confined to a range of from about 63 to about 192. This function provides for additional control on how the simulated texture output will appear. More specifically, confining the pixels to a sub-range provides a perceived texture that may appear more or less similar to the actual texture. The method employed may be an "S-curve" contrast enhancement algorithm that extends the dynamic range of the original texture, e.g., to the full dynamic range of 0-255.

The modified pixel values resulting from the selective enhancement of S612 are applied to an algorithm (or to a similar known histogram) for computing values at S622 corresponding to a halftone dot orientations that may be applied to the substrate. The algorithm is applied by the halftone dot orientation computation component (see 424 of FIG. 1). A halftone dot orientation assigned to each pixel cell may correspond to whether that pixel cell is included in a recessed or a raised portion of the original textured image. With continued reference to FIG. 6, the image data is flattened to into zero (0) and one (1) data representations at S624. In one embodiment, for example, luminance values included in a first sub-range may be assigned a zero (0) while luminance values included in a second sub-range may be assigned a one (1). The first sub-range, for example, may represent the lower one-half range for luminance values (e.g., 0-127). Hence the zero (i.e., the first sub-range) may represent recess portions of the perceived texture, which may appear as lighter gray shades in the original scanned textured substrate. The one (i.e., second sub-range) may represent the upper one-half range for luminance values (e.g., 128-255). Hence, the second sub-range, for example, may represent raised portions of the perceived texture, which may appear as darker gray shades in the original scanned textured substrate.

The pattern of zero and ones are then used to toggle between multiple halftone anisotropic structure orientations. More particularly, a multiplexer toggles between a first screen type halftone (for recess portions) and a second screen type halftone (for raised portions) at S626 to produce a composite result of raster input processed (RIP) image data for rendering at the marking engine at S628.

Ideal screen angles for CMYK color printing place halftone screens at angles of 45° (Black), 75° (Magenta), 90° (Yellow), and 105° (Cyan). In one embodiment, the first screen type may include an assignment for these angles. The halftone screens align CMYK colored dots to form small rosettes that together make up a selected color. Each pixel requires four interleaved halftone cells, one for each color. Since the dot color for each of the four CMYK colors is only one fourth of the area, printing a solid expanse of one color is not possible. The cells are similar to patterned tiles, but there are angle combinations for which the tiling is possible. In order to rotate a halftone screen, the cell must be rotated.

Accordingly, the halftone screens for the cells assigned to a second screen type (i.e., the raised portions) may be rotated a select X-degree. In one embodiment, the angles may be rotated at 45-degrees. Accordingly, the screen angles for the CMYK color printing, for raised portions, may include halftone screens at 90° (Black), 120° (Magenta), 135° (Yellow), and 150° (Cyan). There is no limitation made to the degree of anisotropy used for the second screen angles. However, because cells have to tile, there are only so many combinations of angles available at a given resolution. If the angle combination is not available, the default action is to estimate a nearest approximation.

As mentioned, the orientations of the screens may be arranged at 90-degrees from one another to maximize the perceptibility of the gloss differential. In the discussed embodiment, the differential in gloss between the perceived raised portions and the perceived recess portions may be viewable at any angle. Generally, pixel cells rendered at the first screen type exhibit a first level of gloss. Similarly, pixel cells rendered at the second screen type exhibit a second level of gloss. The difference between the first level of gloss and the second level of gloss varies depending on a viewing angle of the perceived texture substrate. However, (a degree of rotation) is selected such that the gloss difference is always viewable even if the magnitude of that difference is not constant. The method ends at S630

In the discussed embodiment, a raised portion may include a first height and a recess portion includes a second height. Rendering pigmented halftone dots using two orientations produces an image where all raised portions of an original three dimensional substrate are represented at a constant one of two screen angles. However, textured substrates and/or perceived textured images are contemplated to include multiple degrees of elevation (or heights) for various raised portions. For example, an image illustrating a map may be formed using variable halftone dot orientations, wherein each halftone dot orientation represents a certain topographical elevation. In this manner, multiple halftone dot orientations may be a used.

With reference to FIG. 7, an original textured image or an original image may be enhanced in the same manner described above for FIG. 6. The method starts at S700. The relative raised and recess portions may be identified at S604 based on computing a luminance value for each pixel cell. The enhancement may be selectively controlled at S612. The range representing the various elevations of the original textured substrate is next divided into a selective number of sub-ranges at S702. In one embodiment, for illustrative purposes, the range may be divided into four sub-ranges, each sub-range representing one of four possible heights $H_{1-4}$ and/or elevations of a raised portion. For example, a first sub-range, for luminance values of about 0 to about 63, may be selected to represent a first height $H_1$. A second sub-range, for luminance values of about 64 to about 125 may be selected to represent a second height $H_2$. A third sub-range, for luminance values of about 126 to about 188 may be selected to represent a third height $H_3$. And a fourth sub-range, for luminance values of about 189 to about 255 may be selected to represent a fourth height $H_4$. There is no limitation made herein to a number of sub-ranges, the luminance values defining each sub-range, and/or a number of variable texture heights being represented by the number of sub-ranges.

With continued reference to FIG. 7, a halftone dot orientation may be assigned to each pixel cell at S704 based on the sub-range of which the luminance value (of the pixel) is situated. For example, halftone dot orientations for the first height $H_1$ may include ideal angles A° of 90° (Black), 120° (Magenta), 135° (Yellow), and 150° (Cyan). Halftone dot orientations for representing the second height $H_2$ may include the ideal angles A°+X°. For example, the degree for X may include a select 30° rotation. Similarly, select halftone dot orientations for the third height $H_3$ may include the ideal angles A°+2X°. For example, the select halftone dot orientations for representing the third height $H_3$ may be 60°. The select halftone dot orientations for representing the fourth height $H_4$ may include the ideal angles A°+3X°. For example, the select halftone dot orientations for representing the fourth height $H_4$ may be 90°. Accordingly, the lowest recess (e.g., the outer substrate surface) may be represented at a first orientation (for example, ideal angle A°) and the tallest raised portion may be represented at an opposite orientation of A°+90°, to maximize the gloss differential. Each height represented in between the lowest and the tallest portions may include a screen, or halftone dot orientation, situated between the two. However, no limitation is made to the degree of orientation separating the lowest and tallest portions. The tallest raised portion may be represented as A°+180°. Furthermore, ideal angles may not be utilized in contemplated embodiments. A computation, a look-up table, or a similar rendering output system may be used to assign the variable halftone dot amounts to the pixel cells.

With continued reference to FIG. 7, pigmented toner may be rendered onto the uniform substrate at S706 at variable halftone dot orientations. In one embodiment, multiple passes of the substrate through a marking engine may be used to render the pigmented toner onto the substrate, wherein two screen types are rendered per each one pass. In this manner, the image data may be flattened to zero (0) and one (1) data representations for toggling between two screen types during each pass. The method ends at S708

One aspect of the present disclosure is that different halftone dot orientations used for the layer of pigmented toner(s) add a perceived different dimension to the substrate when print output is rendered.

Although the processes for generating a texture description for forming a perceived textured image and/or substrate are illustrated and described above in a form of a series of acts or events, it will be appreciated that the various methods or processes of the present disclosure are not limited by the illustrated ordering of such acts or events. In this regard, except as specifically provided herein, some acts or events may occur in different order and/or concurrently with other acts or events apart from those illustrated and described herein in accordance with the disclosure. It is further noted that not all illustrated actions may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated systems of FIGS. 5-7, wherein the disclosure is not limited to the specific applications and embodiments illustrated and described herein.

The present disclosure may also find other applications in the print industry, such as, for example, enhancing perceived texture on textured substrates. The disclosure is not limited to the applications disclosed herein; rather, the actions may be independently used or combined to produce many perceived textures on one single substrate type, and produce perceived textures using texture descriptions without changing substrates, etc. One aspect of the disclosure is a reduction in costs of the textured substrate, which increases a profit to a print shop. Another aspect of the disclosure is a reduced inventory cost of textured substrates.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for simulating a texture on a uniform substrate, comprising:
providing a first texture description for generating electronic data representing a three-dimensional texture, including:
mapping the electronic data to an L*a*b* color space,
determining a luminance value between 0 and 255 for each pixel cell,
determining a difference between a maximum and a minimum luminance value for providing a partial dynamic range,
enhancing the partial dynamic range to a full dynamic range, and,
computing a halftone dot orientation for the each pixel cell based on the luminance value;
concatenating a print instruction for the first texture description with a print instruction for at least one primary image to form a textured image description; and,
rendering toner at variable halftone dot orientations to a surface portion of a generally uniform substrate for producing the primary image having a perceived textured, wherein each orientation rendered for a pixel on the surface portion represents a certain height of the three-dimensional texture.

2. The method of claim 1, further including:
identifying texture regions of the first texture description using pixel cells of the electronic data; and,
assigning halftone dot orientations to the pixel cells for representing the texture regions.

3. The method of claim 1, wherein the providing a first texture description includes:
scanning an original three-dimensional textured substrate to generate the electronic data.

4. The method of claim 1, wherein the computing a halftone dot orientation includes:
flattening the electronic data into "0" and "1" data representations;
toggling the data representations; and,
assigning the halftone dot orientation for the each pixel cell based on the data representations.

5. The method of claim 1, further including:
confining the full dynamic range to a select dynamic sub-range.

6. The method of claim 5, further including:
determining a modified luminance value for the each pixel using the select dynamic sub-range; and, computing the halftone dot orientation for the each pixel based on the modified luminance value.

7. The method of claim 1, wherein the rendering toner uses a pigmented toner.

8. A computer product comprising a non-transitory computer-readable recording medium encoding instructions which, when executed, perform the method of claim 1.

9. A method for simulating a textured appearance on a uniform substrate, comprising:
   providing a texture description for generating electronic data representing a three-dimensional texture;
   identifying texture regions of the texture description using pixel cells in the electronic data, including:
      mapping the electronic data to an L*a*b* color space,
      determining a luminance value between 0 and 255 for each pixel cell,
      determining a difference between a maximum and a minimum luminance value for providing a partial dynamic range,
      enhancing the partial dynamic range to a full dynamic range, and,
      computing a halftone dot orientation for the each pixel cell based on the luminance value;
   assigning at least two halftone dot orientations to the pixel cells for representing raised and recess texture regions, each halftone dot orientation representing a certain height of the three-dimensional texture; and,
   generating a print instruction rendering toner at the at least two halftone dot orientations to a surface portion of a generally uniform substrate for producing a primary image having perceived texture portions.

10. The method of claim 9, wherein the assigning halftone dot orientations includes:
   flattening the electronic data into "0" and "1" data representations;
   toggling the data representations; and,
   assigning a first halftone dot orientation to the pixel cells having a zero (0) representation and assigning a second halftone dot orientation to the pixel cells having a one (1) representation.

11. The method of claim 10, enhancing the partial dynamic range to a full dynamic range.

12. The method of claim 11, further including:
   confining the full dynamic range to a select dynamic sub-range.

13. The method of claim 9, further including:
   concatenating a print instruction for the texture description with a print instruction for at least one primary image to form a print job.

14. The method of claim 13, further including:
   rendering toner at various halftone dot orientations to a surface portion of a generally uniform substrate for producing a perceived textured image.

15. A computer product comprising a non-transitory computer-readable recording medium encoding instructions which, when executed, perform the method of claim 9.

16. A system for formulating an output having a simulated texture, comprising:
   a textured image source adapted to provide an original texture description representing a three-dimensional texture;
   a processor adapted to identify texture regions of the original texture description using pixel values, the processor being further adapted to associate a variable halftone dot orientation for each pixel cell of the original texture description by determining a luminance value between 0 and 255 for each pixel cell in the original texture description, determining a difference between a maximum and a minimum luminance value for providing a partial dynamic range, enhancing the partial dynamic range to a full dynamic range, and, computing a halftone dot orientation for the each pixel cell based on the luminance value, wherein each orientation represents a certain height of the three-dimensional texture; and,
   an image forming apparatus adapted to render an image having perceived texture portions on a substrate surface by applying a pigmented toner layer to the surface at the variable halftone dot orientations.

* * * * *